(12) United States Patent
Park et al.

(10) Patent No.: US 6,778,230 B2
(45) Date of Patent: Aug. 17, 2004

(54) LIQUID CRYSTAL DISPLAY PANEL AND FABRICATING METHOD THEREOF

(75) Inventors: Jae Deok Park, Kyoungsangbuk-do (KR); Jeong Woo Jang, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/422,795

(22) Filed: Apr. 25, 2003

(65) Prior Publication Data

US 2004/0109100 A1 Jun. 10, 2004

(51) Int. Cl.[7] .................. G02F 1/1345; G02F 1/1333
(52) U.S. Cl. ................................... 349/40; 349/187
(58) Field of Search ........................ 349/40, 187, 192

(56) References Cited

U.S. PATENT DOCUMENTS 5,668,032 A * 9/1997 Holmberg et al. .......... 438/149
5,731,854 A * 3/1998 Kishida .......................... 349/40
5,760,855 A * 6/1998 Nakase et al. ................ 349/40
5,953,086 A * 9/1999 Oogiichi et al. .............. 349/40
6,025,891 A * 2/2000 Kim .............................. 349/40
6,570,630 B2 * 5/2003 Nakajima et al. ............. 349/40

FOREIGN PATENT DOCUMENTS

JP          3-210589          9/1991

* cited by examiner

*Primary Examiner*—Kenneth Parker
(74) *Attorney, Agent, or Firm*—Morgan Lewis & Bockius LLP

(57) ABSTRACT

A liquid crystal display panel includes: a display part having pixels; a non-display part having driving circuits for driving the display part; a control line formed in the non-drive display part for applying a drive signal to signal lines of the display part; a scribed line formed in an area of the non-display part crossing the control line; and a shorting bar that runs along the scribed line and bypasses around an area in which the scribed line crosses the control line.

17 Claims, 5 Drawing Sheets

LIQUID CRYSTAL DISPLAY PANEL AND FABRICATING METHOD THEREOF

This application claims the benefit of Korean Application No. P2002-78377 filed in Korea on Dec. 10, 2002, which is hereby incorporated by reference in its entirety.

BACKGROUND OF THE INVENTION

1. Field of the Invention

The present invention relates to a liquid crystal display panel, and more particularly to a liquid crystal display panel that is adapted to preventing static electricity from coming into picture display part and a fabricating method thereof.

2. Description of the Related Art

Generally, a liquid crystal display uses an electric field across a liquid crystal having dielectric anisotropy to control the light transmittance of the liquid crystal. A liquid crystal display panel includes a plurality of liquid crystal cells in a matrix that each contain liquid crystal and a transistor. The matrix of liquid crystal cells is controlled using a driver circuits so that a picture is displayed on the liquid crystal display panel.

More particularly, the liquid crystal display panel is provided with gate lines in one direction and data lines in other direction such that the gate lines and data lines cross over each other. Each liquid crystal cell is adjacent to a crossover of a gate line and a data line. A common electrode is provided in all of the liquid crystal cells of the liquid crystal display panel. A pixel electrode is provided in each of the liquid crystal cells. A Thin Film Transistor ("TFT") is also provided in each of the liquid crystal cells. Each of the pixel electrodes is connected to a data line through a source electrode and a drain electrode of a TFT. Accordingly, the TFTs of a display part of a liquid crystal display panel are used as switching devices for apply electric fields to the liquid crystal in the liquid crystal cells from the data lines. Each of the gate electrodes of the TFTs is connected to a gate line, which allows pixel voltage signals from the data lines to be applied to the pixel electrodes in response to scan signals from the gate lines.

The driver circuits include a gate driver for driving the gate lines and a data driver for driving the data lines. The gate driver sequentially applies scan signals to the gate lines to sequentially drive the liquid crystal cells of the liquid crystal display panel. The data driver applies video signals to each data line whenever the gate signal is applied to any one of the gate lines. Accordingly, the light transmittance is controlled by way of the electric field applied between the pixel electrodes and the common electrode in accordance with the video signal, thereby displaying a picture on all of the liquid crystal cells of a liquid crystal display panel.

The TFT of a liquid crystal display panel can use an active semiconductor layer formed of amorphous silicon or polycrystalline silicon. An amorphous type liquid crystal display panel that uses TFTs with an amorphous silicon active layer has the advantages of all the TFTs across a matrix of liquid crystal cells having relatively the same electrical characteristics and being relatively stable in their electrical responsiveness. However, the low carrier mobility of the TFTs in an amorphous type liquid crystal display panel makes it difficult to improve pixel density. In the alternative, the poly-type liquid crystal display panel that uses TFTs with a polycrystalline silicon active layer has the advantage of higher pixel density because the polycrystalline silicon active layer has a high carrier mobility. Further, fabricating costs can be reduced because the driver circuits can be mounted on the same substrate as the liquid crystal display panel.

FIG. 1 is a plan view illustrating a configuration of a poly-type liquid crystal display in the related art. As shown in FIG. 1, a liquid crystal display device includes a liquid crystal display panel 10 with a gate driver 12 for driving gate lines GL1 to GLn of the liquid crystal display panel 10 and a data driver 14 for driving data lines DL1 to DLm of the liquid crystal display panel 10. The gate driver 12 sequentially drives the gate lines GL1 to GLn with gate control signals in horizontal periods for each frame of a video signal. The gate driver 12 turns on the TFTs in a horizontal line, so as to allow the data lines DL1 to DLm to be connected to a horizontal row of liquid crystal cells.

The data driver 14 of the liquid crystal display device in FIG. 1 takes samples of a plurality of digital data signals and converts the sampled signals into analog data signals for each horizontal period. The data driver 14 applies the analog data signals to the data lines DL1 to DLm. Accordingly, the liquid crystal cells connected to the turned-on TFTs control the light transmittance in response to the data signals from the data lines DL1 to DLm, respectively.

The liquid crystal display device of FIG. 1 also includes multiplexers MUX1 to MUXk connected between the data driver 14 and the data lines DL1 to DLm. Each multiplexer MUX1 to MUXk is connected to a plurality of data lines, such as the three data lines DLi to DLi+2. Each multiplexer MUX1 to MUXk sequentially applies the video signals, which are supplied from the data driver 14 through a data input line DILi, to three data lines DLi to DLi+2 in accordance with a first to a third control signal supplied through a first to a third control line CL1 to CL3. To this end, each multiplexer MUX1 to MUXk includes three switching devices SW1 to SW3 each connected between a data input line DILi connected to the data driver 14 and respective one of three data lines DLi to DLi+2. Each switching device SW1 to SW3 is normally implemented as an MOS transistor. Each of three switching devices SW1 to SW3 included in the multiplexer MUX receives the first to third control signals at each gate electrode of the switching devices SWi. The first to third control signals have an enable interval, where the control signals progress sequentially to each other and repeatedly, such as an interval of high logic. Accordingly, three switching devices SW1 to SW3 included in the multiplexer are sequentially turned on for each horizontal period to allow the three data lines DLi to DLi+2 to be connected to the data input line DILi, which is connected to the data driver 14. The multiplexers MUX1 to MUXk are formed within the liquid crystal display panel 10 together with a picture display part 16. Typically, the multiplexers MUX1 to MUXk are located adjacent to the picture display part 16 of the liquid crystal display panel 10.

The picture display part 16 has groups of red R, green G and blue B pixels. Each of the red R, green G and blue B pixels consists of a liquid crystal cell with a thin film transistor and liquid crystal. A color filter provided in liquid crystal cell of either red, green and blue respectively defines a red R, green G and blue B pixel.

A fabricating process of such a liquid crystal display panel is divided into a substrate patterning process, an alignment film forming process and a substrate bonding/liquid crystal injection process. The substrate patterning process is subdivided into a patterning process of an upper substrate and a patterning process of a lower substrate. The upper substrate is provided with a black matrix, a color filter and a common electrode. The lower substrate is provided with signal lines, such as the data lines and gate lines, and TFTs for the liquid crystal cells. Subsequently, pixel electrodes are provided for each of the pixel cells. In addition, a plurality of multiplexers for driving the data lines on a basis of time-division is also formed on the lower substrate. Subsequently, an alignment film is formed on either or both the common electrode and the pixel electrodes.

In the substrate bonding/liquid crystal injection process, a sealant is applied to one of the upper and lower substrate. The upper and lower substrates are then bonded together while leaving a hole for injection of liquid crystal between the upper and lower substrates. After the liquid crystal is injected in between the upper and lower substrates, the hole in the sealant is sealed.

Lastly, in a test process, the operating state of the drivers that drive the gate lines and the data lines is tested and bad pixels are detected. FIG. 2 is a view illustrating a shorting-bar for use in testing and draining away static electricity that otherwise would come into the poly-type liquid crystal display panel shown in FIG. 1. As shown in FIG. 2, a shorting bar 20 is used for such test processes to prevent the build up of static electricity. The shorting bar 20 is connected to a ground voltage source GND during the fabricating process and drains away the static electricity transmitted to the gate lines and data lines of the liquid crystal display panel to protect the TFTs in the display part 16 from static electricity.

FIG. 3 is a sectional view of a poly-type liquid crystal display panel, taken along a scribed line SCL1 shown in FIG. 2. As shown in FIG. 3, the shorting bar 20 is formed of the same material as the data input line DILi on an interlayer insulating film 30 above at an edge end part of the lower substrate in a non-display part. Further, the shorting bar 20 is formed crossing over the control lines 22, which are formed on a gate insulating film 28, with the interlayer insulating film 30 therebetween. As shown in FIG. 3, the protective layer 32 formed above the shorting bar 20, which is formed over the control lines 22 has a mesa profile with respect to the rest of the protective layer 32.

After completion of the test process, the scribed line SCL1 is formed with a scribing process of the lower substrate 24. At this moment, the scribed line SCL1 is formed to go over the shorting bar 20 in a perpendicular direction to the control lines 22. Typically, in the related art liquid crystal display panel, there occurs a short-circuit between the control lines 22 and the shorting bar 20 formed above the control lines 22 on the interlayer insulating film 30 during the scribing process. Due to this short-circuit, there occurs a problem in that the static electricity will go into the inside of the liquid crystal display panel along the shorting bar 20 and the control lines 22.

SUMMARY OF THE INVENTION

Accordingly, it is an object of the present invention to provide a liquid crystal display panel that is adapted to preventing static electricity from coming into a picture display part of a liquid crystal display panel and a fabricating method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, there is provided a liquid crystal display panel according to an aspect of the present invention including a display part having pixels; a non-display part having driving circuits for driving the display part; a control line formed in the non-display part for applying a drive signal to signal lines of the display part; a scribed line formed in an area of the non-display part crossing the control line; and a shorting bar that runs along the scribed line and bypasses around an area in which the scribed line crosses the control line.

A fabricating method of a liquid crystal display panel according to another aspect of the present invention includes forming a control line in a non-display part for applying a drive signals to signal lines of a display part; forming a shorting bar to bypass around an area; and forming the scribed line along the shorting bar and in the area of the non-display part, wherein the scribed line crosses the control line in the area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENT

Reference will now be made in detail to the preferred embodiments of the present invention, examples of which are illustrated in the accompanying drawings.

Figure 1:
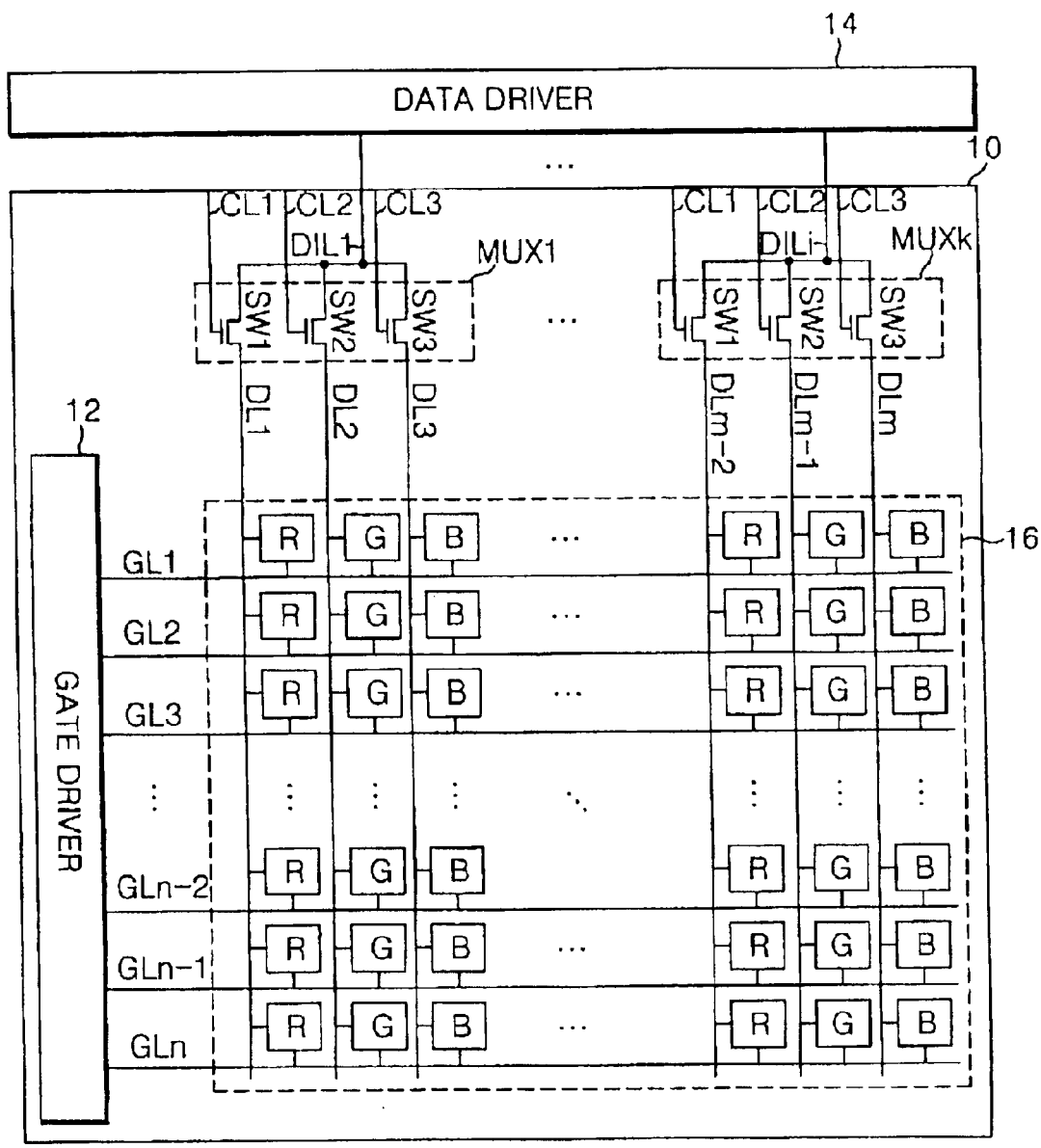
FIG. 1 is a plan view illustrating a configuration of a poly-type liquid crystal display in the related art.
Figure 2:
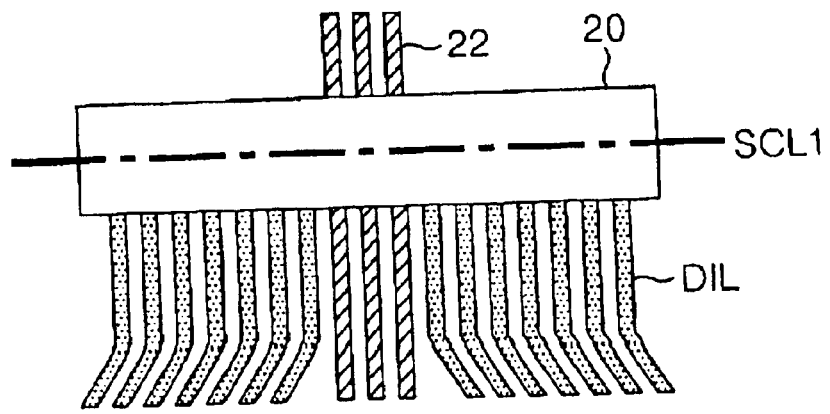
FIG. 2 is a view illustrating a shorting-bar for intercepting static electricity that comes into the poly-type liquid crystal display panel shown in FIG. 1.
Figure 3:
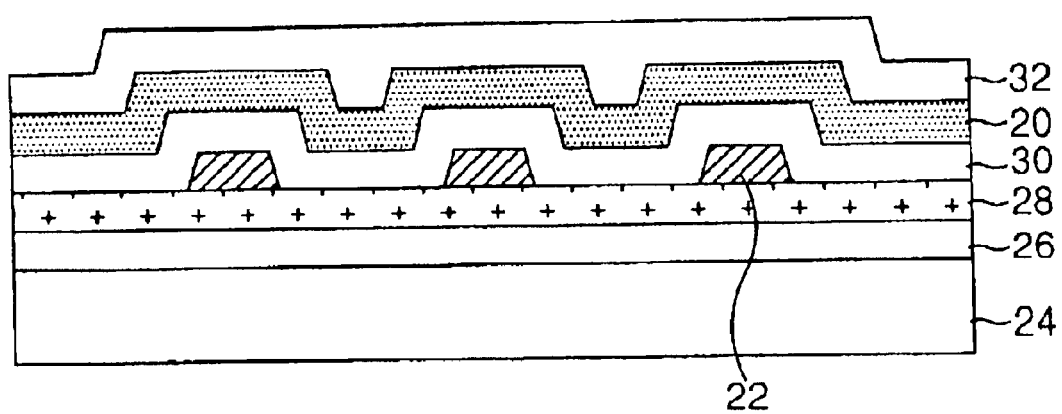
FIG. 3 is a sectional view of a poly type liquid crystal display panel, taken along a scribed line SCL1 shown in FIG. 2.
Figure 4:
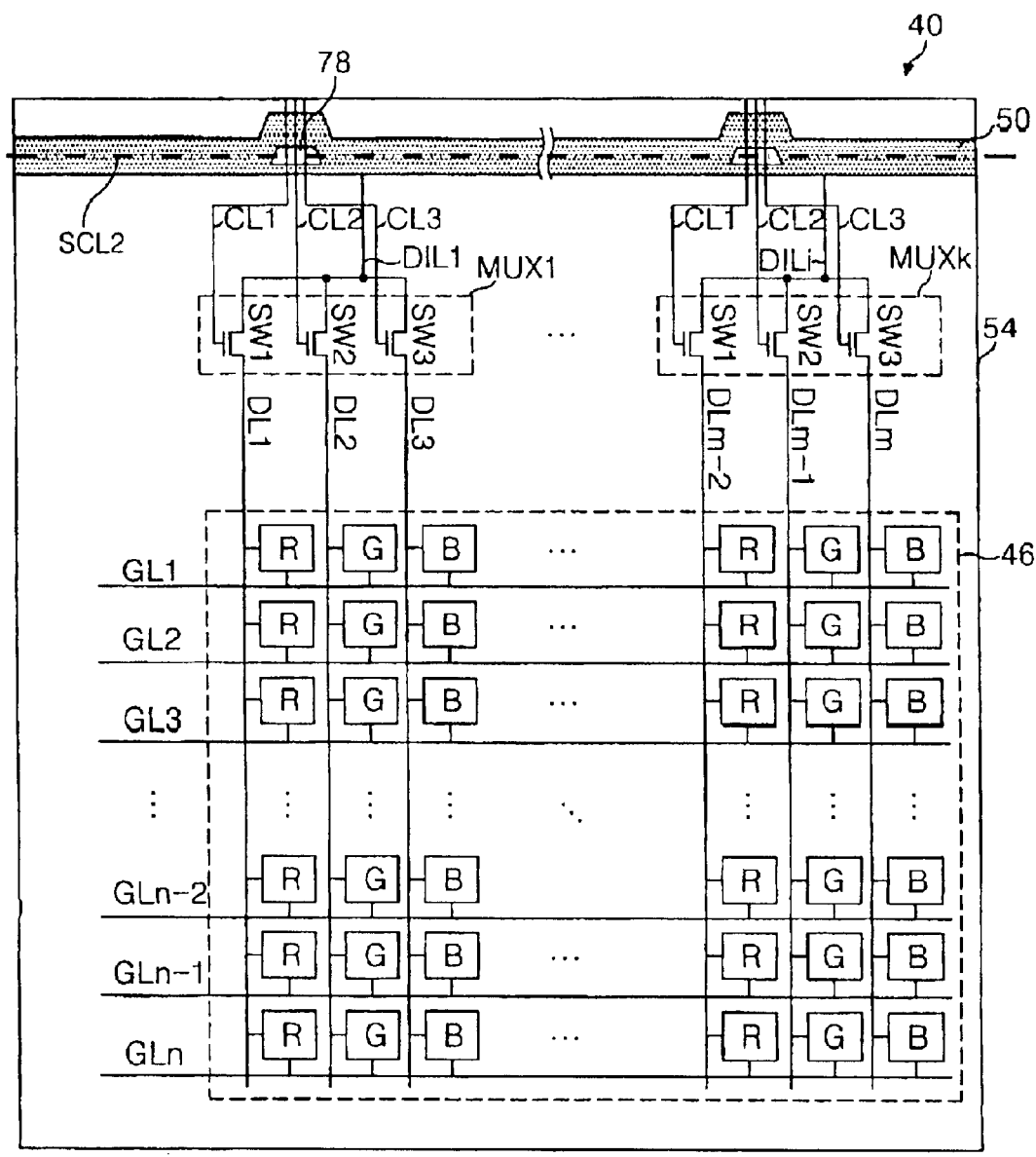
FIG. 4 is a plan view of a poly-type liquid crystal display panel having a shorting bar according to an exemplary embodiment of the present invention.

FIG. 4 is a plan view of a poly-type liquid crystal display panel having a shorting bar according to an exemplary embodiment of the present invention. As shown in FIG. 4, a liquid crystal display panel 40 includes a picture display part 46, which has red R, green G and blue B pixels formed adjacent to the crossovers of the gate lines GL1 to GLn and the data lines DL1 to DLm. Each of the red R, green G and blue B pixels includes a liquid crystal cell with a thin film transistor (not shown). The gate electrode and source electrode of the thin film transistor are connected to the gate line GL and data line DL, respectively. The liquid crystal cell includes a pixel electrode connected to the thin film transistor and a common electrode as a reference electrode that is opposite to the pixel electrode having liquid crystal therebetween.

The gate lines GL1 to GLn are sequentially driven by a horizontal period in each frame in accordance with gate signals generated in a gate driver (not shown). The gate signals cause the thin film transistors ("TFTs") to sequentially turned on a horizontal line of liquid crystal cells and allow the data lines DL1 to DLm to be connected to the liquid crystal cells. The data lines DL1 to DLm are supplied with analog data signals generated from a data driver (not shown). Accordingly, the liquid crystal cells connected to the turned-on TFTs control light transmittance in response to data signals from each data line DL1 to DLm.

The liquid crystal display panel 40 includes multiplexers MUX1 to MUXk connected to the data lines DL1 to DLm in non-display part. Each multiplexer is connected a plurality of data lines, such as the three data lines DLi to DLi+2. The multiplexer MUX1 to MUXk sequentially applies the video signals, which are supplied through a data input line DIL, to three data lines DLi to DLi+2 in accordance with a first to a third control signal supplied through a first to a third control lines CL1 to CL3. To this end, each multiplexer MUX1 to MUXk includes three switching devices SW1 to SW3 each connected between a data input line DIL and respective one of three data lines DLi to DLi+2. Each switching device SW1 to SW3 can be implemented with a field-effect switching device, such as an MOS transistor. Each of three switching devices SW1 to SW3 included in the multiplexer MUX receives the first to third control signals at each gate electrode of the switching devices SW, respectively. The first to third control signals have an enable interval, where the control signals progress sequentially to each other and repeatedly, such as an interval of high logic. Accordingly, three switching devices SW1 to SW3 included in the multiplexer MUX are sequentially turned on for each horizontal period to allow the three data lines Dli to DLi+2 to be connected to a data input line DILi. Such multiplexers MUX1 to MUXk are formed within the liquid crystal display panel 40 together on the same substrate as the picture display part 46. The multiplexers MUX1 to MUXk are located adjacent to the upper part above the picture display part 16 in the non-display part of the substrate.

Figure 5:
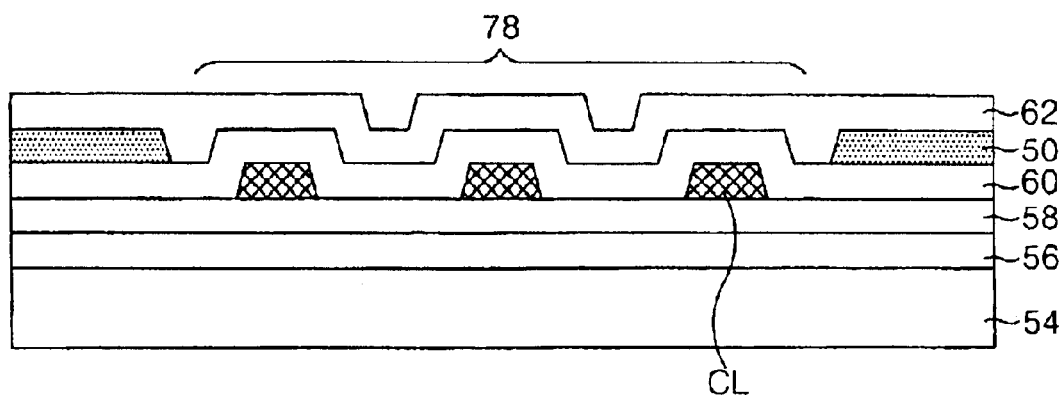
FIG. 5 is a sectional view of a poly-type liquid crystal display panel, taken along a scribed line SCL2 shown in FIG. 4.

FIG. 5 is a sectional view of a poly-type liquid crystal display panel, taken along a scribed line SCL2 shown in FIG. 4. The liquid crystal display panel 40 includes a shorting bar 50 connected to a data input line DILi, and the shorting bar 50 has a bypass 78 at an area where the shorting bar 50 crosses the first to third control lines CL1 to CL3 connected to the multiplexer MUX1 to MUXk. The shorting bar 50 is connected to a ground voltage source GND during the fabricating process, so that static electricity transmitted to the gate line GL or the data line DL of the liquid crystal display panel is drained away, thereby protecting the TFTs of the display part 46 and the multiplexers MUXs from static electricity.

The shorting bar 50 is formed of the same material as the data input line DILi on the interlayer insulating film 60, which is formed on a gate insulating film 58 that is on a buffer film 56 above the lower substrate 54, as shown in FIG. 5. The shorting bar 50 is connected to data input lines DILi in the edge end part of the lower substrate corresponding to a non-display part. Further, the shorting bar 50 is also formed over control lines CLi on the interlayer insulating film 60, which is formed on a gate insulating film 58 that is on a buffer film 56 above the lower substrate 54. However, the shorting bar 50 is not formed over the control lines CLi along a scribed line SCL2. The scribed line SCL2 extends in a direction perpendicular to the control lines CLi to run over the shorting bar 50. The shorting bar 50 bypasses around the area of the substrate in which the scribed line crosses over the control line.

The bypass 78 of the shorting bar 50 can be a hole, as shown in FIG. 4, or a portion that goes around the area of the control lines CLi along the scribed line SCL2. More particularly, the bypass having a portion that goes around the area of the control lines along the scribed line should go around the area on the side adjacent to the display part such that the shorting bar is not cut during subsequent cutting along the scribed line. The bypass 78 prevents contact from occurring between the control lines CLi and the data input lines DILi when scribing occurs along the scribed line SCL2. Accordingly, a short circuit between the shorting bar 50 and the control lines CLi is prevented from occurring during a scribing process such that static electricity will not come into the liquid crystal display panel.

Figure 6:
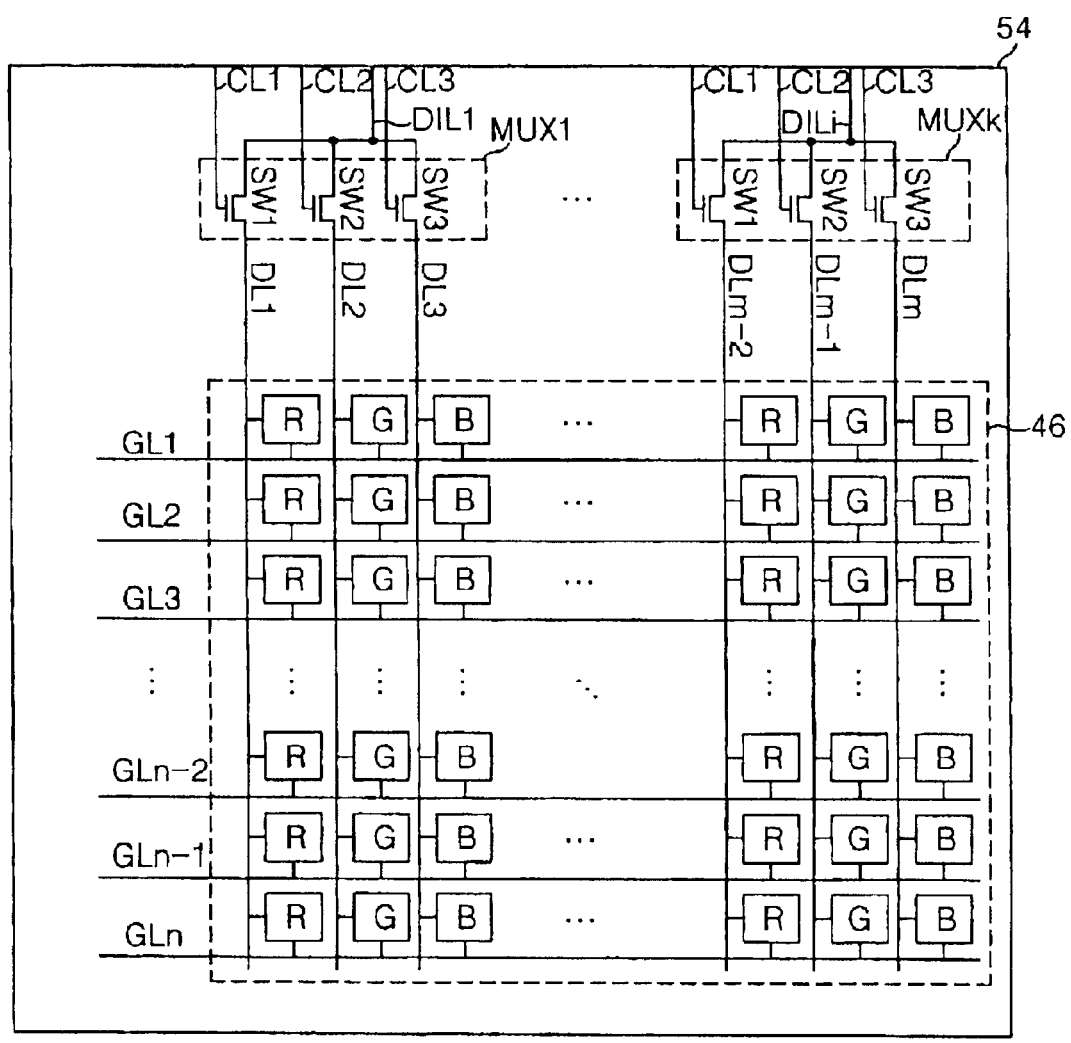
FIG. 6 is a plan view of poly-type liquid crystal display panel after removing the shorting bar shown in FIG. 4.

FIG. 6 is a plan view of poly-type liquid crystal display panel after removing the shorting bar shown in FIG. 4. For example, after a scribing or cutting process is carried out along the scribing line, a grinding process is used to smooth the side of the lower substrate, which may have become rough due to the scribing or cutting process. Subsequently, the shorting bar 50 formed on the lower substrate 54 is removed after the grinding process.

Figure 7:
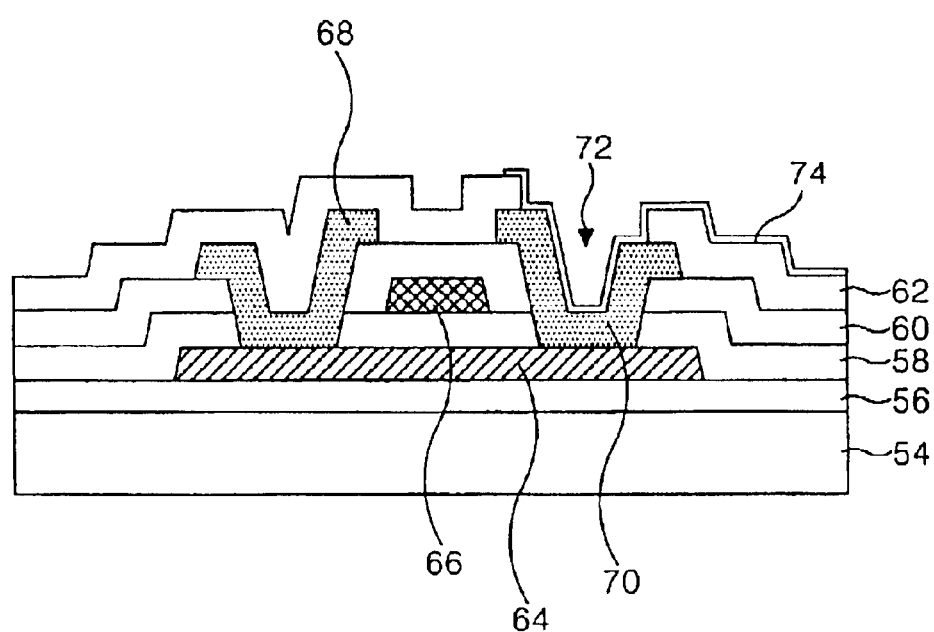
FIG. 7 is a sectional view of a thin film transistor and a pixel electrode formed on a thin film transistor array substrate of a poly-type liquid crystal display panel according to an exemplary embodiment of the present invention.

FIG. 7 is a sectional view of a thin film transistor and a pixel electrode formed on a thin film transistor array substrate of a poly-type liquid crystal display panel according to an exemplary embodiment of the present invention. A fabricating method of the lower substrate of the liquid crystal display panel according to the present invention including such a shorting bar will be described in detail in conjunction with FIG. 5 and 7. More specifically, the fabricating method will be described with regard to both the picture display part 46 and the area of the bypass 78.

A buffer film 56 of insulating material such as silicon dioxide $SiO_2$ is deposited on the lower substrate 54, and then an amorphous silicon film is deposited thereon. Subsequently, a laser crystallizes the amorphous silicon film into a polycrystalline silicon film. The polycrystalline silicon film is then patterned to form an active layer 64, which can be included in both the TFTs of the picture display part 46 and the field effect devices in the multiplexers MUXi.

A gate insulating film 58 is deposited on the entire surface of the buffer film 56 and above the active layer 64. A metal layer is patterned to form gate patterns that include the gate lines GL, the control lines CL and gate electrodes 66. An interlayer insulating film 60 is deposited on the entire surface of the gate insulating film 58 and over the gate patterns. The interlayer insulating film 60 is patterned to form contact holes passing through the interlayer insulating film 60 and the gate insulating film 58.

A source/drain metal layer is then deposited and patterned to form source/drain patterns that include the data lines DLi, the data input lines DILi, source electrodes 68, drain electrodes 70 and the shorting bar 50. The source electrode 68 and the drain electrode 70 are formed in contact with the active layer 64 through the contact holes. In addition, the shorting bar 50 is formed with a bypass hole 78 such that there is an opening above the control lines CLi along a later formed scribed line SCL2.

A protective film 62 is deposited on the interlayer insulating film 60 and the source/drain patterns. A drain contact hole 72 is formed in the interlayer insulating film 60 such that the drain electrodes 70 of the TFTs in the picture display part 46 are exposed. A transparent conductive material is deposited on the protective film 62 and connected to a drain electrode 70 of the TFT in the picture display part 46. The transparent conductive material is patterned to form a pixel electrode 74. Accordingly, the liquid crystal display device according to the present invention has the bypass 78 detouring the shorting bar 50 around an area along a scribing or cutting line where the control lines CL cross the scribing or cutting line. After testing, a scribed line SCL2 is formed. Accordingly, static electricity can be prevented from going into the inside of the liquid crystal display panel that would otherwise result from a scribing process or scribed line that short-circuits the control lines CLi to the data input lines DILi.

As described above, the liquid crystal display panel and the fabricating method therof according to the present invention can prevent a short-circuit between the control lines and the shorting bar from being generated during a scribing or cutting process. Accordingly, the static electricity can be prevented from coming into the picture display part and the driver circuit, such as the multiplexer.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel comprising:
   a display part having pixels;
   a non-display part having driving circuits for driving the display part;
   a control line formed in the non-display part for applying a drive signal to signal lines of the display part;
   a scribed line formed in an area of the non-display part crossing the control line; and
   a shorting bar that runs along the scribed line and bypasses around an area in which the scribed line crosses the control line.

2. The liquid crystal display panel according to claim 1, wherein the non-display part includes a data input line connected to the driving circuits and to the shorting bar.

3. The liquid crystal display panel according to claim 1, wherein the shorting bar bypasses around the area on a side of the area adjacent to the display part.

4. The liquid crystal display panel according to claim 1, wherein the shorting bar bypasses around the area with a hole in the shorting bar.

5. The liquid crystal display panel according to claim 1, wherein the driving circuits comprises a plurality of multiplexers driving signal lines of the display part on a basis of time-division.

6. The liquid crystal display panel according to claim 5, wherein the multiplexers in the non-display part include switching devices with an active layer made of polycrystalline silicon.

7. The liquid crystal display panel according to claim 6, wherein a plurality of control lines applying control signals from the driving circuits to the switching devices in the multiplexers.

8. The liquid crystal display panel according to claim 1, wherein each pixel of the display part includes a thin film transistor with an active layer made of polycrystalline silicon, a gate electrode, source electrode and a drain electrode.

9. The liquid crystal display panel according to claim 8, wherein the control line and the gate electrode are formed of the same material.

10. The liquid crystal display panel according to claim 8, wherein the shorting bar, the source electrode and the drain electrode are formed of the same material.

11. A fabricating method of a liquid crystal display panel, comprising:
    forming a control line in a non-display part for applying a drive signals to signal lines of a display part;
    forming a shorting bar to bypass around an area; and
    forming the scribed line along the shorting bar and in the area of the non-display part, wherein the scribed line crosses the control line in the area.

12. The fabricating method according to claim 11, further comprising:
    forming a thin film transistor at an intersection of signal lines in a display part; and
    forming a pixel electrode connected to the thin film transistor.

13. The fabricating method according to claim 12, wherein the step of forming a thin film transistor includes:
    forming an active layer on a substrate;
    forming a gate insulating film on the active layer;
    forming a gate electrode on the gate insulating film;
    forming an interlayer insulating film on the gate insulating film on which the gate electrode is formed, wherein the interlayer insulating film has contact holes on the active layer; and
    forming a source electrode and a drain electrode respectively connected to the active layer via contact holes.

14. The fabricating method according to claim 12, further comprising:
    forming a plurality of multiplexers that drive signal lines of the display part on a basis of time-division.

15. Method according to claim 14, further comprising:
    forming an active layer of a thin film transistor included in the display part and an active layer of a switching device included in the multiplexer from polycrystalline silicon.

16. The fabricating method according to claim 13, further comprising:
    form the control line and the gate electrode from the same material.

17. The fabricating method according to claim 13, further comprising:
    forming the shorting bar, the source electrode and the drain electrode of the same material.

* * * * *